(12) United States Patent
Chen

(10) Patent No.: US 12,265,654 B2
(45) Date of Patent: Apr. 1, 2025

(54) ROTARY RELUCTANCE INPUT DEVICE WITH ASYMMETRIC POLES

(71) Applicant: Apple Inc., Cupertino, CA (US)

(72) Inventor: Denis G. Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 17/821,948

(22) Filed: Aug. 24, 2022

(65) Prior Publication Data

US 2023/0096068 A1 Mar. 30, 2023

Related U.S. Application Data

(60) Provisional application No. 63/261,658, filed on Sep. 24, 2021.

(51) Int. Cl.
*G09G 5/00* (2006.01)
*A63F 13/24* (2014.01)
*G06F 3/01* (2006.01)
*G06F 3/0354* (2013.01)

(52) U.S. Cl.
CPC .............. *G06F 3/011* (2013.01); *A63F 13/24* (2014.09); *G06F 3/0354* (2013.01); *G05B 2219/35457* (2013.01)

(58) Field of Classification Search
CPC ........ G06F 3/011; G06F 3/016; G06F 3/0354; G06F 3/0362; G06F 2203/013; G06F 2203/04105; A63F 13/24; A63F 2250/488; G05B 2219/35457
See application file for complete search history.

(56) References Cited

U.S. PATENT DOCUMENTS

| | | | |
|---|---|---|---|
| 5,394,131 A * | 2/1995 | Lungu | H01H 51/2209 335/265 |
| 6,005,551 A | 12/1999 | Osborne et al. | |
| 7,283,120 B2 | 10/2007 | Grant | |
| 8,259,066 B2 * | 9/2012 | Cheng | H02K 33/16 345/163 |
| 8,545,323 B2 * | 10/2013 | McVicar | A63F 13/235 345/161 |
| 9,557,830 B2 * | 1/2017 | Grant | A63F 13/00 |
| 10,226,697 B2 | 3/2019 | Schmitz et al. | |
| 10,737,172 B2 | 8/2020 | Schmitz et al. | |
| 10,775,891 B2 | 9/2020 | Sinclair et al. | |
| 2002/0190528 A1* | 12/2002 | Ootori | F16D 57/002 290/45 |

(Continued)

*Primary Examiner* — Joe H Cheng
(74) *Attorney, Agent, or Firm* — Kubota & Basol LLP

(57) ABSTRACT

A torque feedback mechanism for a trigger or lever using a rotary reluctance engine is disclosed. In some examples, the rotary reluctance engine includes two fixed asymmetric core/coil assemblies located on one or both sides of a permanent magnet. In some examples, the core/coil assemblies are fixed in place, and the permanent magnet is coupled to the trigger or lever such that the magnet rotates with respect to the core/coil assemblies as the trigger or lever is squeezed. When the coils of the engine are programmably energized, the cores are magnetized at different angular rotations of the trigger or lever, creating a torque feedback profile that can be quickly modified to provide more or less torque at different angular displacements during the squeezing of the trigger or lever to emulate different triggers or levers.

25 Claims, 12 Drawing Sheets

(56) References Cited

U.S. PATENT DOCUMENTS

| | | | | |
|---|---|---|---|---|
| 2013/0147610 A1* | 6/2013 | Grant | .................... | A63F 13/285 |
| | | | | 340/12.5 |
| 2014/0315642 A1* | 10/2014 | Grant | .................... | A63F 13/285 |
| | | | | 345/184 |
| 2015/0238855 A1* | 8/2015 | Uy | ......................... | A63F 13/24 |
| | | | | 463/37 |
| 2016/0132116 A1* | 5/2016 | Grant | ...................... | G06F 3/016 |
| | | | | 345/156 |
| 2016/0162025 A1* | 6/2016 | Shah | ....................... | G06F 3/016 |
| | | | | 345/156 |
| 2016/0179220 A1* | 6/2016 | Venkatesan | ............. | A63F 13/23 |
| | | | | 345/156 |

* cited by examiner

SYMMETRIC RADIUS

ASYMMETRIC RADIUS

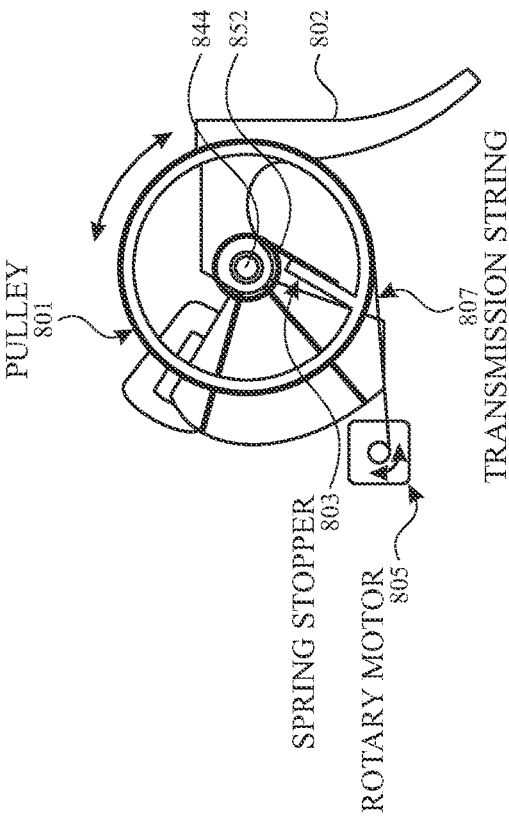
FIG. 8B
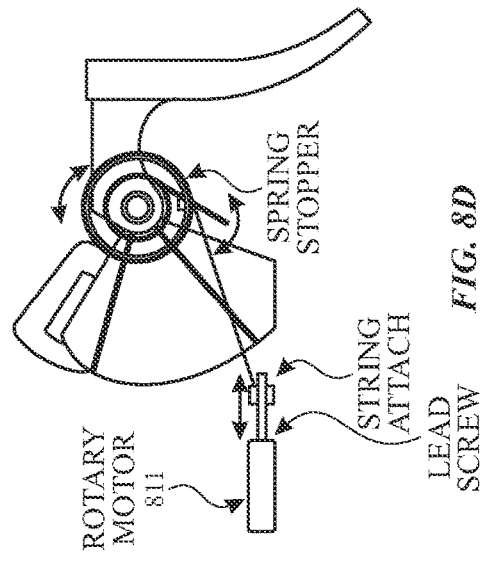
FIG. 8D
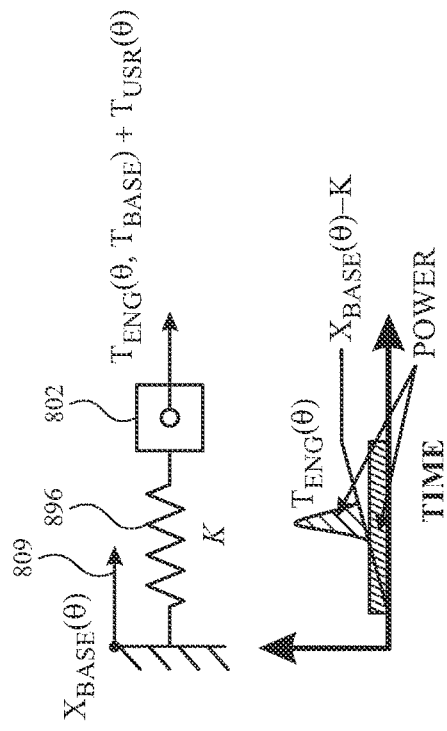
FIG. 8A
FIG. 8C

ROTARY RELUCTANCE INPUT DEVICE WITH ASYMMETRIC POLES

CROSS-REFERENCE TO RELATED APPLICATIONS

This application claims the benefit of U.S. Provisional Application No. 63/261,658, filed Sep. 24, 2021, the content of which is incorporated herein by reference in its entirety for all purposes.

FIELD OF THE DISCLOSURE

This relates generally to electronic input devices, and more particularly to rotary reluctance input devices with asymmetric poles.

BACKGROUND OF THE DISCLOSURE

Many types of input devices are presently available for performing operations in a computing system, such as buttons or keys, mice, trackballs, joysticks, touch panels, touch screens and the like. Touch-sensitive devices, and touch panels and touch screens in particular, are quite popular because of their ease and versatility of operation as well as their affordable prices. However, although touch panels and touch screens can provide virtual input devices (e.g., virtual buttons, virtual keys, virtual sliders, virtual dials, etc.) as a substitute for mechanical input devices, the virtual input devices often lack the tactile feel and feedback of their mechanical counterparts. In some instances, this lack of tactile feel can prevent a user from determining that an input is being properly applied, or that an input has been positively received. In other instances, this lack of tactile feel can detract from the realism of providing an input and diminish the enjoyment of providing inputs for entertainment purposes. For example, a virtual piano keyboard does not provide the feeling of a physical key depression, and a virtual trigger does not provide a confirmation that a physical trigger was sufficiently squeezed.

Other input devices may be physical in nature to avoid the limitations of virtual input devices, but may still not accurately emulate the tactile feedback of the physical input device it is intended to replace due to mechanical differences between the two. For example, the keys of a digital piano will not have the physical hammers and strings of an acoustic piano, and therefore may not feel like the keys of an acoustic piano. Similarly, a trigger of an electronic gaming controller will not have the springs and levers of a mechanical trigger, and therefore may not feel like a mechanical trigger.

SUMMARY OF THE DISCLOSURE

This relates to providing a torque feedback mechanism for a trigger or lever using a rotary reluctance motor (or engine). In some examples, the rotary reluctance engine includes two fixed asymmetric poles formed from two core/coil assemblies of unequal size and/or shape located on one or both sides of a permanent magnet, or outside the magnet. In some examples, the poles are fixed in place, and the permanent magnet is coupled to the trigger or lever such that the magnet rotates with respect to the poles as the trigger or lever is squeezed. In other examples, one or more permanent magnets are fixed in place, and the poles are coupled to the trigger or lever such that the poles rotate with respect to the magnet as the trigger or lever is squeezed. When no power is applied to the reluctance motor, the torque feedback profile felt by the finger during the squeezing of the trigger or lever can be similar to that of a mechanical spring. However, when the coils of the motor are programmably energized, the cores are magnetized at different angular rotations of the trigger or lever, creating a torque feedback profile that can be quickly modified to provide more or less torque at different times during the squeezing of the trigger or lever to emulate different triggers or levers. For convenience, examples of the disclosure described hereinbelow will primarily use the term trigger, with the understanding that use of the term trigger is intended to be inclusive of triggers and other similar structures such as levers.

BRIEF DESCRIPTION OF THE DRAWINGS

FIG. 8A illustrates a symbolic representation of power consumption of the rotary reluctance engine according to some examples of the disclosure.

FIG. 8B illustrates a rotary motor for providing a constant torque on a trigger coupled to a rotary reluctance engine according to some examples of the disclosure.

FIG. 8C illustrates a symbolic representation of the hybrid power consumption of a rotary reluctance engine and a rotary motor according to some examples of the disclosure.

FIG. 8D illustrates an alternative approach to FIG. 8B for providing a constant torque on a trigger coupled to a rotary reluctance engine according to some examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to providing a torque feedback mechanism for a trigger or lever using a rotary reluctance motor (or engine). In some examples, the rotary reluctance engine includes two fixed asymmetric poles formed from two core/coil assemblies of unequal size and/or shape located on one or both sides of a permanent magnet, or outside the magnet. In some examples, the poles are fixed in place, and the permanent magnet is coupled to the trigger or lever such that the magnet rotates with respect to the poles as the trigger or lever is squeezed. In other examples, one or more permanent magnets are fixed in place, and the poles are coupled to the trigger or lever such that the poles rotate with respect to the magnet as the trigger or lever is squeezed. When no power is applied to the reluctance motor, the torque feedback profile felt by the finger during the squeezing of the trigger or lever can be similar to that of a mechanical spring. However, when the coils of the motor are programmably energized, the cores are magnetized at different angular rotations of the trigger or lever, creating a torque feedback profile that can be quickly modified to provide more or less torque at different times during the squeezing of the trigger or lever to emulate different triggers or levers. For convenience, examples of the disclosure described hereinbelow will primarily use the term trigger, with the understanding that use of the term trigger is intended to be inclusive of triggers and other similar structures such as levers.

Figure 1A:
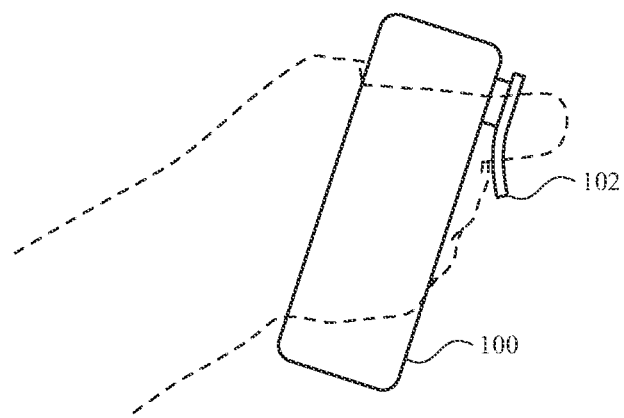
FIGS. 1A-1C illustrate various examples of input devices with a trigger for enabling user input to the input device according to some examples of the disclosure.
Figure 1B:
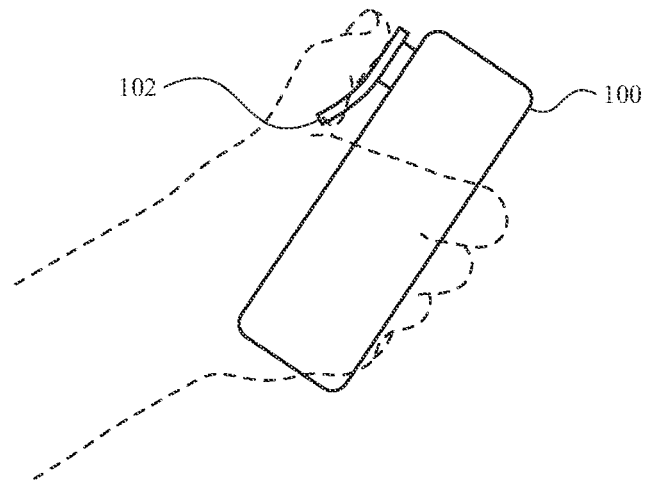
Figure 1C:
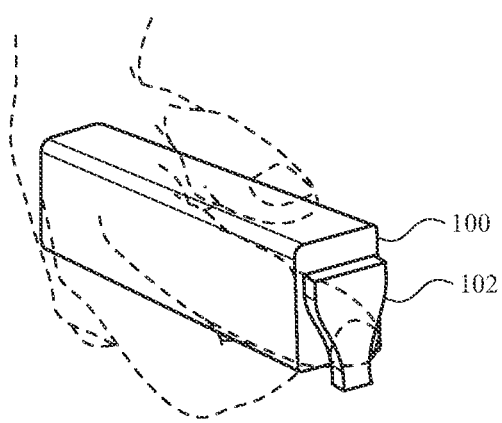

FIGS. 1A-1C illustrate various examples of input devices 100 with trigger 102 for enabling user input to the input device according to some examples of the disclosure. In the examples of FIGS. 1A-1C, input devices 100 are symbolically shown as rectangular blocks, but it should be understood that the rectangular blocks are only representative, and in practice various ergonomic shapes can be employed. As shown in FIGS. 1A-1C, trigger 102 can be employed at different locations on input device 100 that are suitable to be activated by a finger or thumb of a user.

Figure 2:
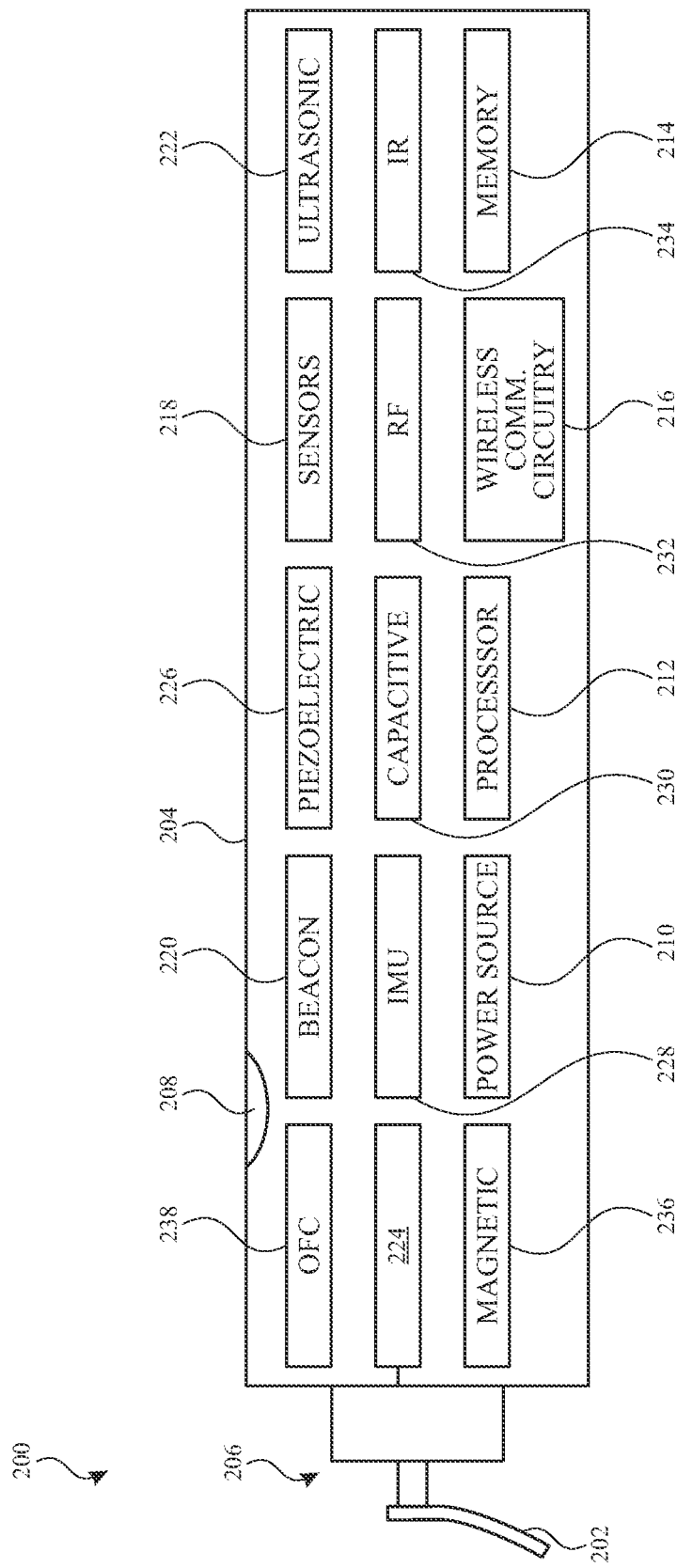
FIG. 2 illustrates a block diagram of an input device with a trigger assembly including a trigger according to examples of the disclosure.

FIG. 2 illustrates a block diagram of input device 200 with trigger assembly 206 including trigger 202 according to examples of the disclosure. Input device 200 can including a housing, which can include an elongate body 204 with trigger assembly 206 including trigger 202 at a distal end of the elongate body. In some examples, elongate body 204 can be ergonomically shaped and sized for being gripped by a hand of a user. The housing can include one or more ergonomic depressions or curves (symbolically represented by curvature 208) as a guide for placement of one of a user's fingers (e.g., thumb or index finger), and/or shaped to comfortably conform to the palm of the user. Curvature 208 can result in the orientation of the input device in a range of positions with respect to a user's hand and fingers. The circuitry of input device 200 can be disposed in the housing. For example, the circuitry can include power source 210 (e.g., a battery), processing circuitry (e.g., processor 212), memory 214, wireless communication circuitry 216 (although wired input devices 200 are contemplated as well) and various sensors 218. In some examples, input device 200 can include outward facing camera (OFC) 238, beacon transmitter 220 (e.g., using any electromagnetic signals), an ultrasonic transceiver 222, one or more buttons or force sensors 224 (e.g., mechanical buttons, strain gauges, capacitive gap force sensors), piezoelectric sensors 226, an IMU 228 (and/or other motion or orientation device such as an accelerometer or gyroscope), one or more capacitive sensors 230, a radiofrequency (RF) transceiver 232, infrared transceiver 234, a magnetic sensor (and/or generator) 236, among other suitable sensors. Processor 212 can communicate, either directly or indirectly, with some or all of the other components of input device 200. For example, a system bus or other communication mechanism can provide communication between the various components of input device 200.

In some examples, input device 200 can be a game controller that can communicate with a computing system located separate from the input device, although in other examples the computing system may be located within the input device. In some examples, the computing system can receive one or more inputs from input device 200 as inputs to a game or other application running in the system, which can cause events to be triggered and actions to be taken, including the updating of displayed content. The computing system can be included in, for example, a wearable device, mobile telephone, digital media player, personal computer, tablet computing device, or any mobile or non-mobile computing device. In some examples, the computing system can be an AR/VR system with a head-mounted display. In other examples, input device 200 can be any device with a trigger, lever or other rotating actuator whose torque response profile is preferably nonlinear and configurable over a range of angular displacements.

It should be apparent that the architecture shown in FIG. 2 is only one example architecture of input device 200, and that the input device can have more or fewer components than shown, or a different configuration of components. The various components shown in FIG. 2 can be implemented in hardware, software, firmware or any combination thereof, including one or more signal processing and/or application specific integrated circuits.

Figure 3A:
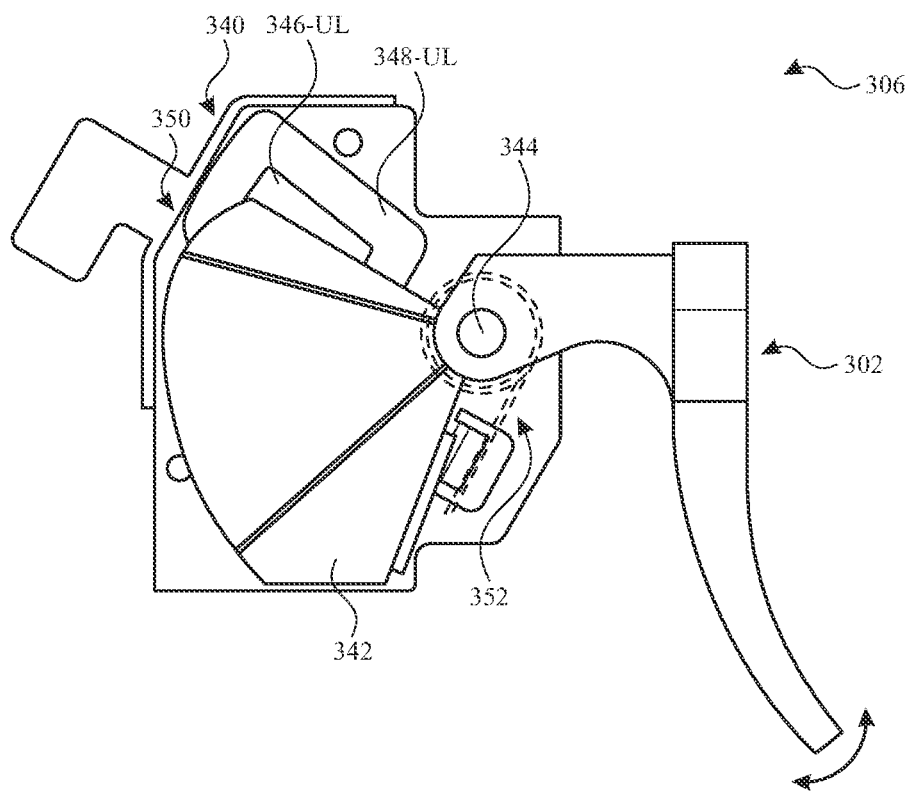
FIG. 3A illustrates a side view of a trigger assembly with a trigger and a rotary reluctance engine according to some examples of the disclosure.

FIG. 3A illustrates a side view of trigger assembly 306 with trigger 302 and rotary reluctance engine according to some examples of the disclosure. In the example of FIG. 3A, trigger 302 is affixed to magnet 342, and both are pivotably and rotationally coupled to spindle 344 such that the trigger and magnet rotate within trigger assembly 306 when the trigger is actuated by a user. Core 346-UL is wrapped with the windings of coil 348-UL to form a magnetic pole affixed to a housing of trigger assembly 306, and is shown proximate to and partially hidden behind magnet 342. A second fixed core/coil assembly 340 (magnetic pole) is located in the same plane as core 346 and coil 348 and affixed to a housing of trigger assembly 306, though this second magnetic pole is hidden behind magnet 342 in FIG. 3A. These two core/coil assemblies result in two asymmetric poles. Additionally, two additional core/coil assemblies (e.g., two asymmetric poles) are located in front of magnet 342, although these two assemblies are not shown in FIG. 3A for purposes of simplifying the figure. In some examples, magnetic sensor 350 can be affixed to a housing of trigger assembly 306 and located proximate to a portion of an outer perimeter of magnet 342, and torsion spring (or other type of spring) 352 can be coupled to trigger 302. Spring 352 can provide a spring force and add mechanical stiffness to the displacement of magnet 342 with respect to the poles. Magnetic sensor 350 can be a Hall sensor or any other type of sensor that can sense the angular position or displacement of the magnet, which provides an indication of the angular displacement of the trigger. Because the reluctance engine of FIG. 3A only rotates a relatively small amount, the engine preferably provides a wide angular response over its range of angular displacement. In examples of the disclosure, this wide response is provided by the asymmetric pole design utilizing multiple poles.

Figure 3B:
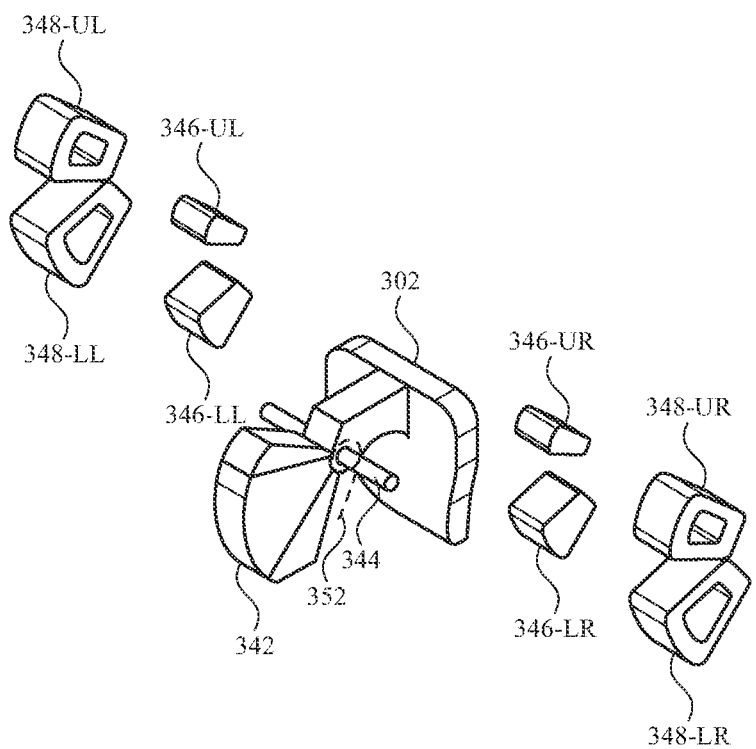
FIG. 3B illustrates an exploded perspective view of some of the components of a trigger assembly in a rotary reluctance engine according to some examples of the disclosure.

FIG. 3B illustrates an exploded perspective view of some of the components of trigger assembly 306 in a rotary reluctance engine according to some examples of the disclosure. In the example of FIG. 3B, all four cores (346-LL, 346-UL, 346-LR, and 346-UR) are visible, as are all four coils (348-LL, 348-UL, 348-LR, and 348-UR). As shown in FIG. 3B, these four core/coil assemblies are fixed in trigger assembly 306 on either side of magnet 342. Note that the upper core/coil assemblies (346-UL/348-UL and 346-UR/348-UR) are of unequal size and/or shape as compared to the lower core/coil assemblies (346-LL/348-LL and 346-LR/348-LR) to create asymmetric poles on each side of magnet 342. However, the upper core/coil assemblies on both sides of the magnet are substantially the same size and shape, and the lower core/coil assemblies on both sides of the magnet are also substantially the same size and shape. Having poles of the same size and shape on both sides of magnet 342 can balance the off-axis force felt by the magnet. The magnetic attraction between magnet 342 and each core/core assembly on one side of the magnet will create a large off-axis force. Therefore, the space between the core/coil assemblies and magnet 342 is preferably equal on both sides of the magnet, otherwise the magnet will pull to one side because of the imbalance in the attraction forces. If an imbalance is present, an off-axis force can be introduced on the spindle 344, which produces more friction.

In operation, energy (e.g., an electrical current) may be applied to coils 348 at different times to actuate the reluctance haptic engine and provide torque at trigger 302 in opposition to the torque applied by a user to the trigger. These opposing torques can vary depending on the displacement (amount of rotation) of the trigger. Coils 348 may include one or more conduction loops (e.g., electromagnetic coils, electrically conductive coils, wire loops, other electrically conductive materials, and the like). Electrical currents (e.g., alternating current, electromagnetic signals, drive signals, and the like) induced in the conduction loops may generate magnetic flux. The magnetic flux passing through magnet 342 and/or the poles causes a reluctance force that attempts to push magnet 342 and the poles farther apart or pull the magnet and poles closer together, though the movement of the magnet is limited to its rotational movement about spindle 344, and thus the reluctance force appears as a torque experienced on trigger 302.

Figure 3C:
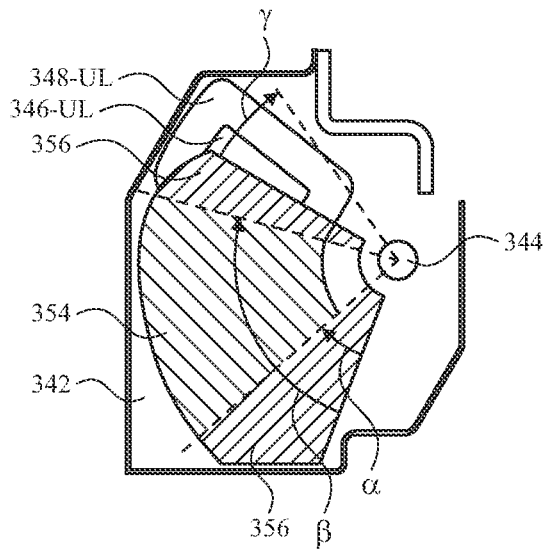
FIG. 3C illustrates some parameters and the operation of a magnet in a rotary reluctance engine according to some examples of the disclosure.

FIG. 3C illustrates some parameters and the operation of magnet 342 in a rotary reluctance engine according to some examples of the disclosure. In the example of FIG. 3C, magnet 342 is a single magnet with different segments having different magnetic pole directions and defining different magnet boundaries. There are multiple methods of manufacturing the magnet. In one method, the magnet segments can be cut from bulk magnets, and each segment is separately magnetized before they are adhered together. In another method, a single magnet can be polarized by placing it into a rig having a specific shape imprinted on it to magnetize the three segments, one at a time. For example, segment 354 can be magnetized to have a pole direction pointing into the page (parallel to spindle 344), while segments 356 can be magnetized to have a pole direction pointing out of the page (also parallel to spindle 344). As coil 348-UL energizes, depending on the direction of coil, the magnetic field coming out of core 346-UL will be either coming out of the page or into the page, and that magnetic field can interact with the magnet boundaries to rotate magnet 342 either clockwise or anti-clockwise.

Figure 3D:
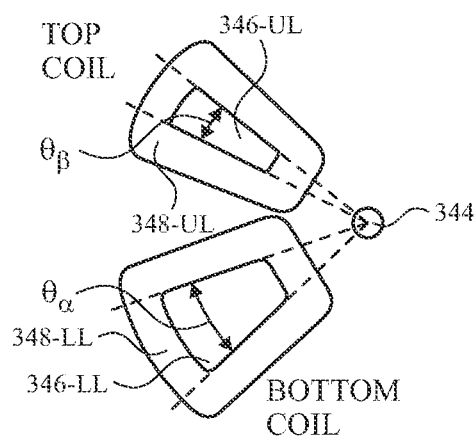
FIG. 3D illustrates some parameters of asymmetric cores and coils in a rotary reluctance engine according to some examples of the disclosure.

FIG. 3D illustrates some parameters of asymmetric cores 346 and coils 348 in a rotary reluctance engine according to some examples of the disclosure. In the example of FIG. 3D, angle $\theta_\alpha$ is the angular width of core 346-LL, while angle $\theta_\beta$ is the angular width of core 346-UL. Instead of a rotationally symmetric motor, a limited number of asymmetric magnetic poles are utilized to create a nonlinear torque response at different angular displacements that is optimized for a trigger application, for example.

Figure 3E:
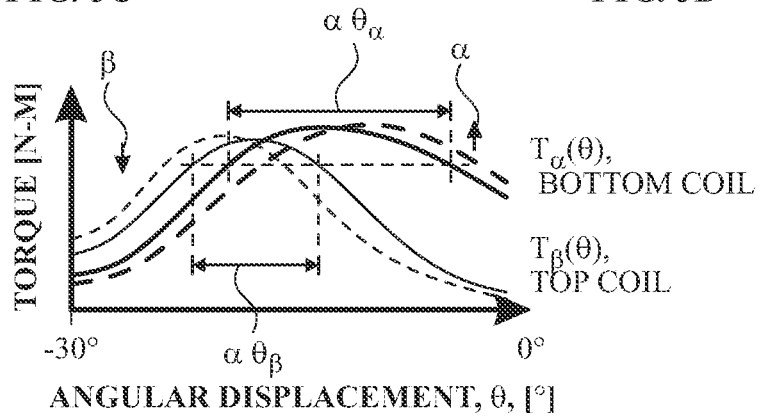
FIG. 3E is a graph of angular displacement of a magnet vs. the torque applied by the coils in a rotary reluctance engine according to some examples of the disclosure.

FIG. 3E is a graph of angular displacement of magnet 342 vs. torque applied by coils 348 in a rotary reluctance engine according to some examples of the disclosure. As illustrated in the example of FIG. 3E, there are tradeoffs on the design of the segments of magnet 342, cores 346 and coils 348. If the angle α defining lower segment 356 is increased, torque applied by bottom coil 348-LL will exceed a particular torque threshold at a lower angular displacement, but the torque at higher angular displacements will be weaker. The width of the force profile lobe is generally proportional to the angular width of core 346-LL, $\theta_\alpha$. Similarly, if the angle β defining upper segment 356 is decreased, torque applied by upper coil 348-UL will exceed the torque threshold at a higher angular displacement, but torque at lower angular displacements will be weaker. The width of the force profile lobe is generally proportional the angular width of the corresponding core 346-UL, $\theta_\beta$. In general, by sizing segments 354 and 356, and cores 346, the torque responses shown in FIG. 3E can be adjusted, and through various combinations of these geometries, the engine response can be optimized to provide a desired torque profile.

More specifically, with reference to FIGS. 3C-3E, angle γ can be selected to provide adequate clearance for magnet 342, angles α and $\theta_\alpha$ can be selected to shape the position and width of the first torque profile $T_\alpha(\theta)$, angles β and $\theta_\beta$ can be selected to shape the position and width of the second torque profile $T_\beta(\theta)$, and the optimal power allocation:

$$T_{tot}(\theta) = \sqrt{\frac{T_\alpha(\theta)^2}{T_\alpha(\theta)^2 + T_\beta(\theta)^2}} T_\alpha(\theta) + \sqrt{\frac{T_\beta(\theta)^2}{T_\alpha(\theta)^2 + T_\beta(\theta)^2}} T_\beta(\theta)$$

can be shaped to fit a desired profile.

In some examples, and based on the design of the reluctance engine, magnet 342 can interact with both the top and bottom coils (348-UL and 348-LL) at all times, regardless of the position of the magnet. The combined torque from both top and bottom coils (348-UL and 348-LL) produces the overall response curve. In other examples, depending on the design of the reluctance engine, one coil can interact with only one boundary on magnet 342, but not the other boundary. In other examples, one coil can interact with both boundaries on magnet 342. It should be noted that although the reluctance engine examples described herein utilize two core/coil subassemblies on at least one side of magnet 342, with the magnet having two boundaries, in other examples more than two core/coil subassemblies can be utilized on at least one side of the magnet, and the magnet can have more than two boundaries.

Figure 3F:
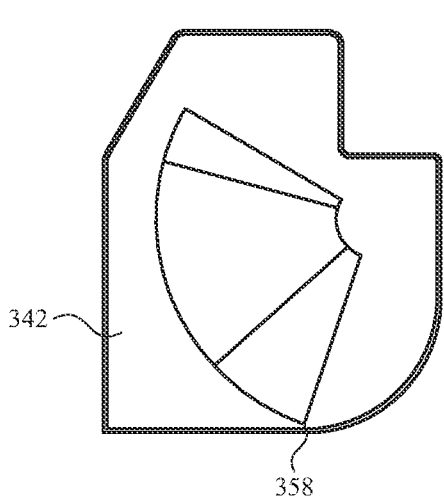
FIGS. 3F-3G illustrate a geometric optimization of magnet of a rotary reluctance engine according to some examples of the disclosure.
Figure 3G:
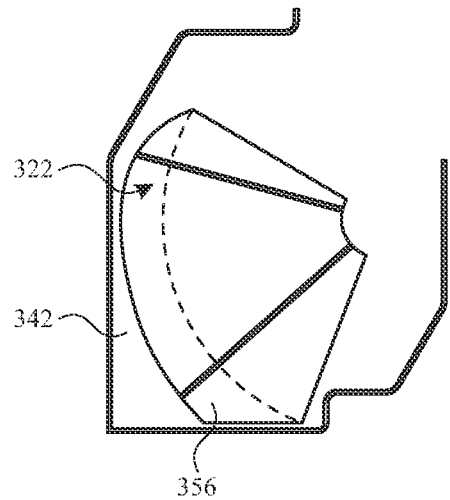

FIGS. 3F-3G illustrate a geometric optimization of magnet 342 of a rotary reluctance engine according to some examples of the disclosure. In the example of FIG. 3F, magnet 342 has a symmetric radius, and therefore the radius is limited because it will contact housing at point 358. However, because the reluctance engine does not have rotational symmetry, and has limited angular displacement, an asymmetric radius can be used to take advantage of otherwise unused space inside the housing. As shown in the example of FIG. 3G, magnet 342 has an asymmetric radius that is shortened in the segment of the magnet that can come into contact (or near contact) with the housing. In particular, segment 356 can have its radius shortened and tailored to the shape of the housing (see flattened area of the segment adjacent to the housing bottom). Because of the truncation of the outer perimeter edge of segment 356, the radius of the remainder of magnet 342 can be increased, as shown by the dashed line in FIG. 3G (indicating the previous radius of the magnet). Because of this increased radius, the volume of magnet 342 can be increased as shown by area 322, and therefore its magnetic flux can also be increased to maximize the torque of the reluctance engine.

Figure 4A:
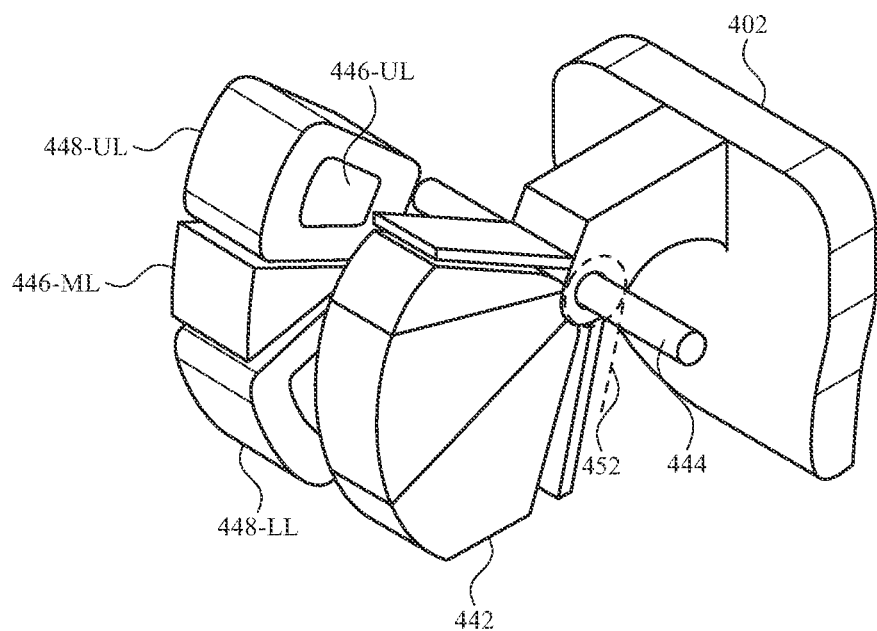
FIG. 4A illustrates a perspective view of a trigger assembly with a trigger and a rotary reluctance engine according to some examples of the disclosure.

FIG. 4A illustrates a perspective view of trigger assembly 406 with trigger 402 and rotary reluctance engine according to some examples of the disclosure. In the example of FIG. 4A, trigger 402 is coupled to magnet 442, and both are pivotably coupled to spindle 444 such that the trigger and magnet rotate within trigger assembly 406 when the trigger is actuated by a user. FIG. 4A is similar to FIG. 3A, except that asymmetric two coil/core assemblies are located on only the left side of magnet 442. These two core/coil assemblies result in two asymmetric poles. In some examples, a magnetic sensor (not shown in FIG. 4A) can be located in proximity to magnet 442.

Figure 4B:
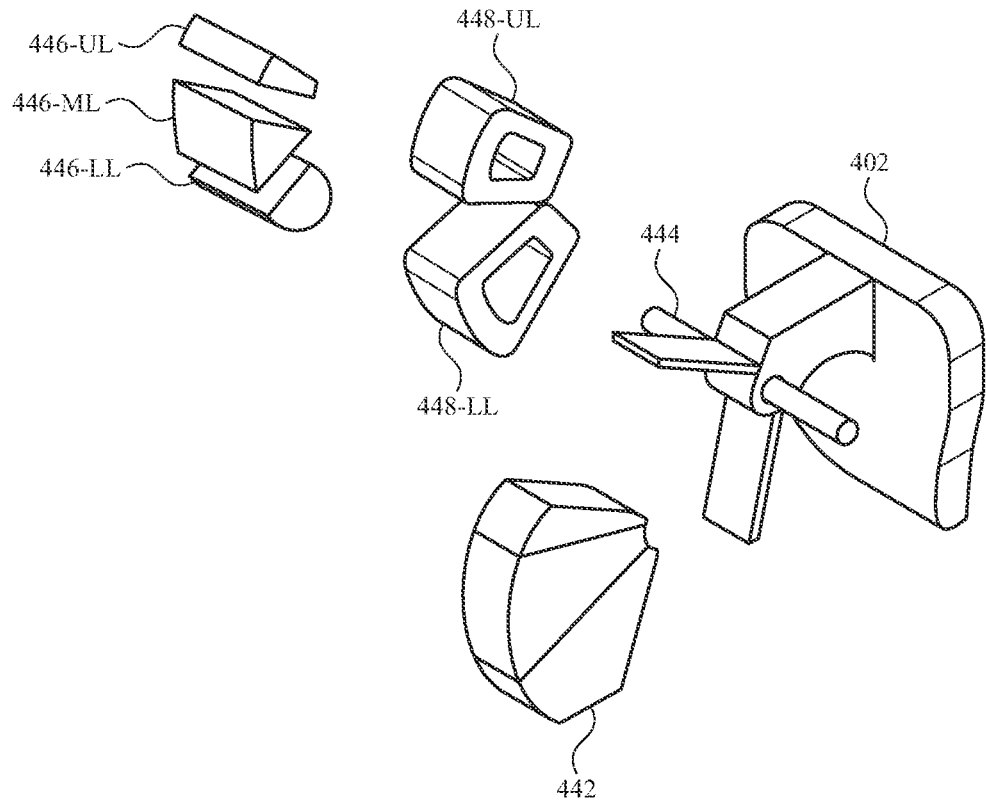
FIG. 4B illustrates an exploded perspective view of some of the components of a trigger assembly of a rotary reluctance engine according to some examples of the disclosure.

FIG. 4B illustrates an exploded perspective view of some of the components of trigger assembly 406 of a rotary reluctance engine according to some examples of the disclosure. In the example of FIG. 4B, two cores (446-LL, 446-UL) are visible, as are two coils (448-LL, 448-UL). In addition, a middle core 446-ML can be formed between lower coil 448-LL and upper coil 448-UL. Middle core 446-ML can fill up the space between lower coil 448-LL and upper coil 448-UL and make the engine a bit stronger. With three magnetic cores now influencing the magnet, the angles for each of them can be optimized individually to design the desired response curve. In some examples, these core/coil assemblies are fixed in trigger assembly 406 on the left side of magnet 442.

Figure 5A:
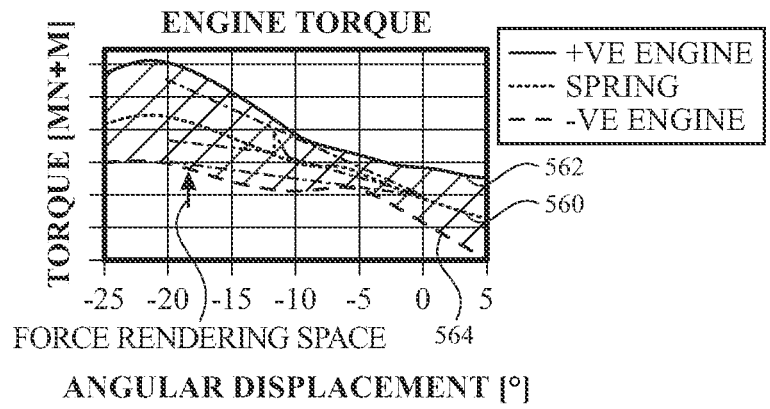
FIG. 5A illustrates a plot of the overall torque generated by a rotary reluctance engine for a given angular displacement according to some examples of the disclosure.

FIG. 5A illustrates a plot of the overall torque generated by rotary reluctance engine for a given angular displacement according to some examples of the disclosure. When no power is applied to the cores, as the angular displacement of the trigger increases (from right to left in FIG. 5A), the torque experienced at the trigger is a relatively linear spring force indicated by line 560. However, when the coils of the reluctance engine are energized with positive current, the response curve 562 can be produced. When the coils are energized with negative current, the response curve 564 can be produced. The curves 562 sand 564 define a rendering space that is bounded by the power budget of the system. Through the design of the rotary reluctance engine and the energizing sequence of the engine, a number of different response curves within the rendering space can be produced. In one example, if a linear slope is the experience to be rendered, then even at zero angular displacement, the magnet interacts with the core inside the coil, and a positive torque will be generated. A negative current is required to bring the torque to zero. In practice, the force curve 560 is purposefully designed to have non-zero force at zero angular displacement. This residue force is used to securely park the trigger against a mechanical stop so the trigger has a defined aesthetic appearance. At some amount of angular displacement, a positive current will need to be applied to bring the torque response back to a linear curve. In other words, every time the user presses on the trigger, if the software is trying to render a linear spring, then power will have to be supplied to the system. With a linear curve as a baseline, any rendering space above or below the linear curve can be achieved with software, by burning power in the engine. So if it desired that the torque profile be more nonlinear, power can be applied to deviate from the linear curve. In general, any response curve defined by the target user experience can be produced and optimized for a given rendering space.

For example, a steep response curve can feel like a stiffer spring, while a gradual response curve can feel like a softer spring. In some examples, a piecewise linear profile can be programmed to change the amount and direction of current provided to the coils of the engine to create different responses depending on the angular displacement. For example, a response profile that provides an increasing amount of torque as the trigger is squeezed, until a certain angular displacement is achieved at which time the torque relaxes, can feel like the trigger of a gun. Other response profiles can simulate a bow, a blaster, etc.

Figure 5B:
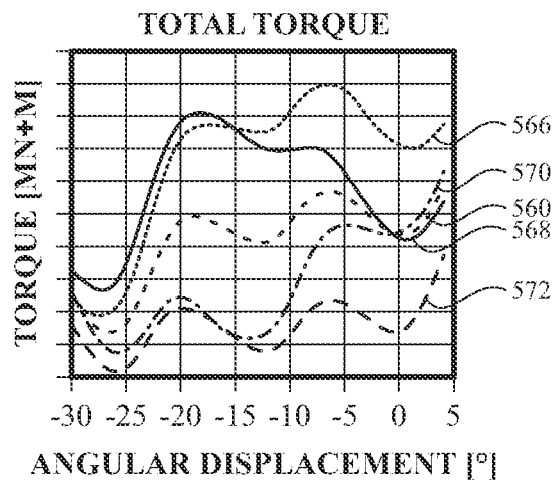
FIG. 5B illustrates a plot of the individual torque generated by the coils on one side of the rotary reluctance engine of either FIGS. 3A-3B or FIGS. 4A-4B for a given angular displacement according to some examples of the disclosure.

FIG. 5B illustrates a plot of the individual torque generated by the coils on one side of the rotary reluctance engine of either FIGS. 3A-3B or FIGS. 4A-4B for a given angular displacement according to some examples of the disclosure. Curved line 560 represents the intrinsic magnetic pull-back force between the magnet 342 or 442 and ferritic cores 346 or 446. When no energy is provided to the coils, the only torque is applied by the mechanical torsion spring 452, the magnet, and the poles, and the torque experienced at the trigger is indicated by line 560. Curved line 566 represents the net force on the trigger as a function of angular displacement when positive current is applied on coil 348-LL, 348-LR, or 448-LL and curved line 572 represents the net force on the trigger as a function of angular displacement but with negative current on those coils. If the bottom coil is energized with positive current, the torque experienced at the trigger is indicated by line 566, which demonstrates high torque at small angular displacements where the engine is most efficient, but decreases in torque as the angular displacement increases. As the torque from the bottom coil decreases, the torque from the top coil can come into play. Similarly, curved line 568 represents the net force on the trigger as a function of angular displacement when positive current is applied on coil 348-UL, 348-UR, or 448-UL, and curved line 570 represents the net force on the trigger as a function of angular displacement but with negative current on those coils. If the top coil is energized with positive current, the torque experienced at the trigger is indicated by line 568, which demonstrates low torque at small angular displacements, but increases in torque as the angular displacement increases. If the top coil is energized with negative current, the torque experienced at the trigger is indicated by line 570. If the bottom coil is energized with negative current, the torque experienced at the trigger is indicated by line 572. The polarity of coil forces line 566 and line 568 is chosen such that the resulting magnetic flux through middle core 446-ML, when both coils are energized, works in concert with upper core 446-UL and lower core 446-LL.

Figure 5C:
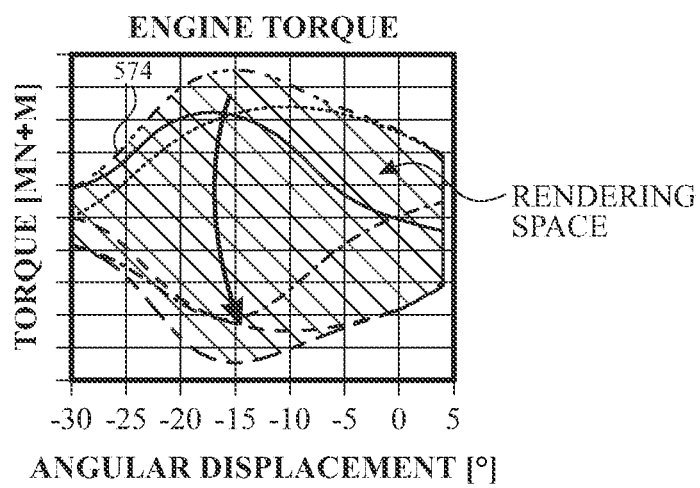
FIG. 5C illustrates a plot of the overall torque generated by a rotary reluctance engine for a given angular displacement according to some examples of the disclosure.

FIG. 5C illustrates a plot of the overall torque generated by rotary reluctance engine for a given angular displacement according to some examples of the disclosure. FIG. 5C replots FIG. 5B with intrinsic force set to zero (net force—intrinsic force) to evaluate the pure engine force. Curved line 574 represents the maximum engine force for a given maximum combined power across all coils. When power delivered into the two coils is optimized, the overall response curve is indicated by line 574, which is the maximum torque that can be exerted from the combination of the two coils. At zero angular displacement, the torque is relatively weak, but for the same amount of power, the torque increases with increasing angular displacement. The downward arrow in FIG. 5C indicates that any stiffness profile within this engine force zone can be rendered.

Figure 5D:
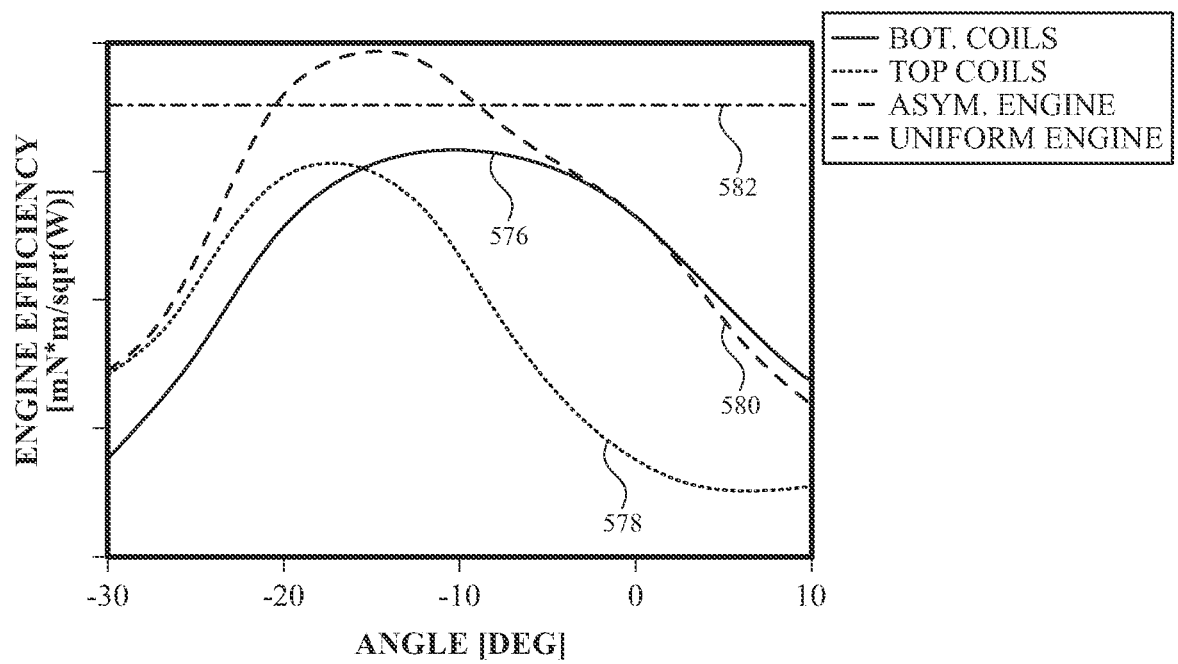
FIG. 5D illustrates a comparison of engine efficiency as a function of angular displacement for the asymmetric rotary reluctance engine of FIG. 3B and a unipolar motor according to some examples of the disclosure.

FIG. 5D illustrates a comparison of engine efficiency as a function of angular displacement for the asymmetric rotary reluctance engine of FIG. 3B and a unipolar motor according to some examples of the disclosure. Engine efficiency is the normalized torques from the top and bottom coils of the rotary reluctance engine of FIG. 3B under an optimal power allocation as described above, and can be computed as:

$$\eta(\theta) = \frac{T_{tot}(\theta)}{\sqrt{P}}$$

In the example of FIG. 5D, the engine efficiency profile of the two lower coils of the reluctance engine of FIG. 3B is indicated by curve 576, while the engine efficiency profile of the two upper coils of the reluctance engine is indicated by curve 578. The combined engine efficiency profile for the asymmetric rotary reluctance engine of FIG. 3B is a function of angular displacement of the magnet as indicated by curve 580. In contrast, the engine efficiency of a rotationally symmetric unipolar engine is constant regardless of the magnet's angular displacement as indicated by line 582. As FIG. 5D indicates, over most angular displacements, and especially at high angular displacement, the unipolar engine requires more power to produce the same amount of torque (line 582) than the combined torque profile of the bipolar rotary reluctance engine of FIG. 3B (curve 580), because energizing two coils is more efficient than providing all power into one coil, and the asymmetric engine allows for shifting higher engine efficiency towards higher angular displacement.

Figure 5E:
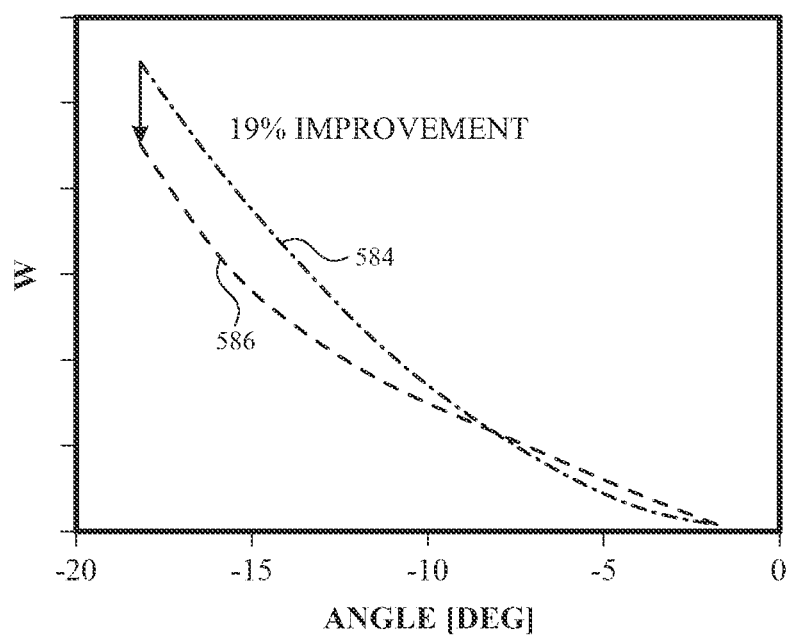
FIG. 5E illustrates a comparison of power as a function of angular displacement for a uniform rotationally symmetric unipolar motor and the asymmetric rotary reluctance engine of FIG. 3B according to some examples of the disclosure.

FIG. 5E illustrates a comparison of power as a function of angular displacement for a uniform rotationally symmetric unipolar motor and the asymmetric rotary reluctance engine of FIG. 3B according to some examples of the disclosure. In the example of FIG. 5E, with a target end torque of 28.0 nM*m, the power profile of the unipolar motor is indicated by curve 584, while the power profile of the asymmetric rotary reluctance engine of FIG. 3B is indicated by curve 586. A comparison of the two curves indicates that a power savings of about 19% can be achieved.

Figure 6:
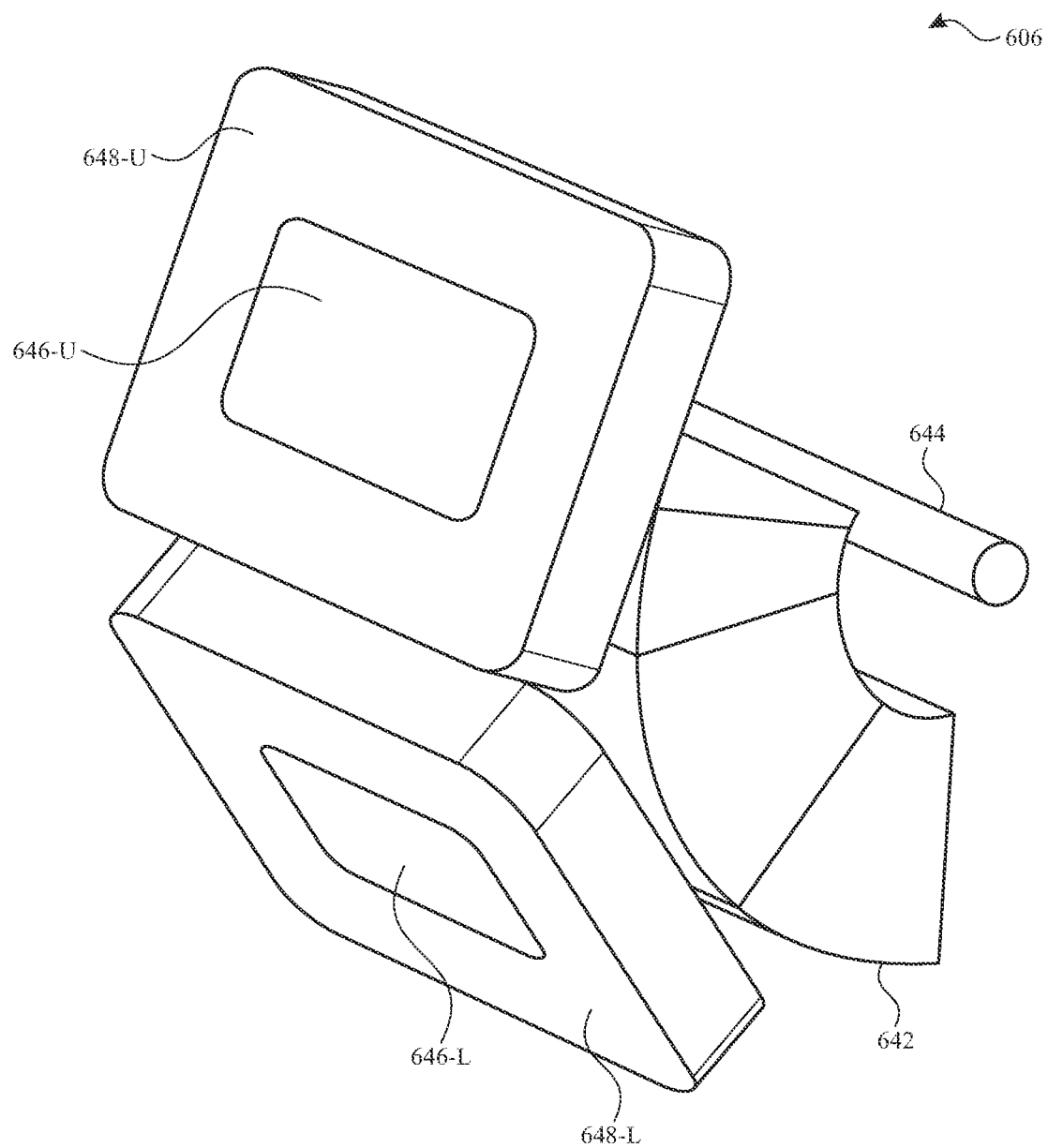
FIG. 6 illustrates a trigger assembly with an alternative location for the coil/core assemblies of the rotary reluctance engine of FIGS. 4A-4B according to some examples of the disclosure.

FIG. 6 illustrates trigger assembly 606 with an alternative location for the coil/core assemblies of the rotary reluctance engine of FIGS. 4A-4B according to some examples of the disclosure. In the example of FIG. 6, a trigger (not shown) is coupled to magnet 642, and both are pivotably coupled to spindle 644 such that the trigger and magnet rotate within trigger assembly 606 when the trigger is actuated by a user. However, unlike FIGS. 4A-4B, core/coil assembly 646-L and 648-L, and core/coil assembly 646-U and 648-U are fixed along a partial outer circumference (e.g., a portion of an outer perimeter) of magnet 642, and face a rotational axis (e.g., spindle 644) of trigger assembly 606. The example of FIG. 6 still utilizes asymmetric magnetic poles, but the magnetic fields of the poles are polarized radially and orthogonally with respect to spindle 644.

Figure 7A:
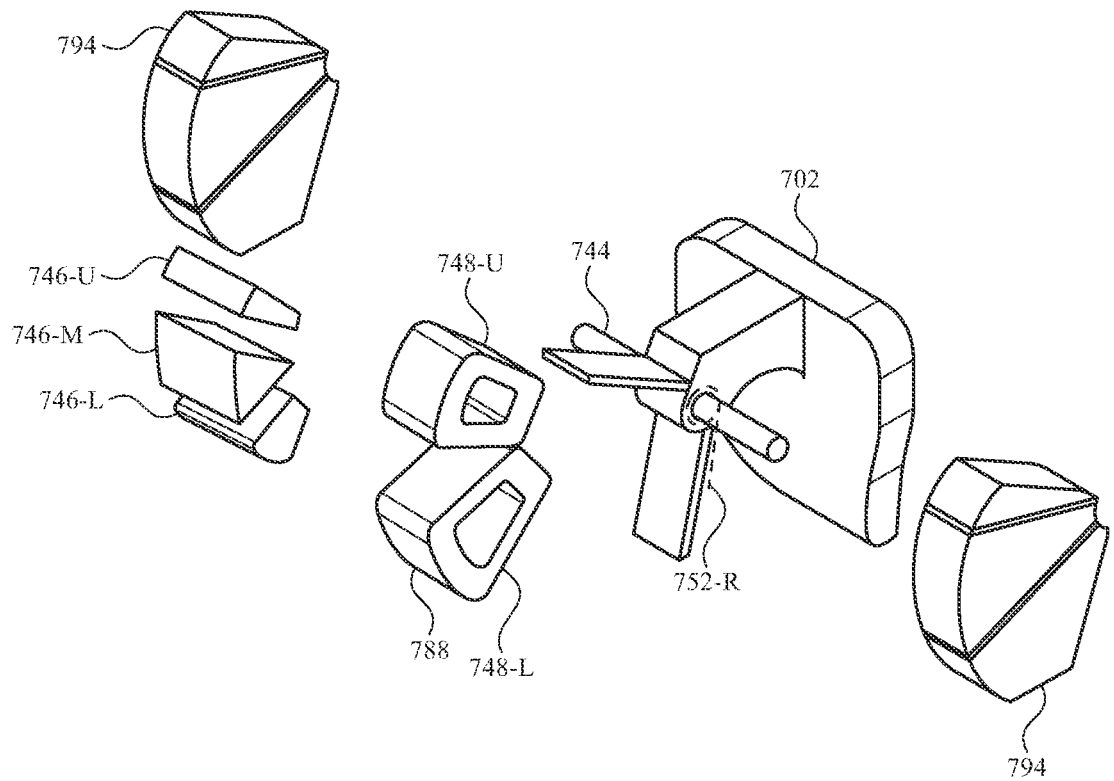
FIG. 7A illustrates an exploded perspective view of some of the components of a trigger assembly with a trigger and rotary reluctance engine according to some examples of the disclosure.

FIG. 7A illustrates an exploded perspective view of some of the components of trigger assembly 706 with trigger 702 and rotary reluctance engine according to some examples of the disclosure. In the example of FIG. 7A, core 746-U is wrapped with the windings of coil 748-U to form an upper core/coil assembly (e.g., an upper pole), and core 746-L is wrapped with the windings of coil 748-L to form a lower core/coil assembly (e.g., a lower pole) in the same plane as the upper core/coil assembly. These two core/coil assemblies result in two asymmetric poles. In some examples, middle core 746-M and middle magnet 742-M can be fixed between the upper and lower coil/core assembly. Unlike previous examples, where the trigger is affixed to a magnet, in the example of FIG. 7A trigger 702 is affixed to the upper and lower core/coil assemblies and optionally to middle core 746-M and middle magnet 742-M, and all are pivotably and rotationally coupled to spindle 744 such that the trigger and core/coil assemblies rotate within trigger assembly 706 when the trigger is actuated by a user. Left magnet 742-L and right magnet 742-R are affixed to trigger assembly 706, proximate to and on opposite sides of the upper and lower core/coil assemblies so that the upper and lower core/coil assemblies can rotate between the left and right magnets. Left and right magnets 742-L and 742-R can have multiple segments having different magnetic pole directions and defining different magnetic boundaries, similar to what is described in FIG. 3C. However, in some examples, a gap 794 can be maintained between the upper and middle magnet segments. In some examples, an optional sensing magnet 742-M can be fixed to trigger assembly 706 and located along a partial perimeter of the rotational path of the upper and lower core/coil assemblies. Sensing magnet 742-M can generate a magnetic field that can be picked up by magnetic sensor 750 (e.g., a Hall sensor; see FIG. 7B), or any generic magnetic sensor that can translate magnetic intensity into angular displacement. In some examples, left and right torsion springs 752-L and 752-R can be coupled to trigger 702.

FIG. 7A also illustrates a geometric optimization of lower core/coil assembly according to some examples of the disclosure. Similar to the optimization concept discussed above with respect to FIG. 3F, because the reluctance engine of FIG. 7A does not have rotational symmetry, and has limited angular displacement, an asymmetric radius can be used to take advantage of otherwise unused space inside the housing. As shown at FIG. 7A, bottom coil 748-L has an asymmetric radius that is shortened in the area that can come into contact (or near contact) with the housing. In particular, bottom coil 748-L can have its radius shortened and tailored to the shape of the housing (see flattened area 788 of the bottom coil adjacent to the housing bottom). Bottom core 746-L can also be tailored accordingly. Because of the truncation of the lower core/coil assembly, the radius of the remainder of the lower core/coil assembly and also the upper core/coil assembly can be increased. Because of this increased radius, the volume of the lower and upper core/coil assemblies can be increased to maximize the torque of the reluctance engine.

In operation, an electrical current may be applied to coils 748 at different times via a folding flex circuit to actuate the reluctance haptic engine and provide torque at trigger 702 in opposition to the torque applied by a user to the trigger. These opposing torques can vary depending on the displacement (amount of rotation) of the trigger. Coils 748 may include one or more conduction loops (e.g., electromagnetic coils, electrically conductive coils, wire loops, other electrically conductive materials, and the like). Electrical currents (e.g., alternating current, electromagnetic signals, drive signals, and the like) induced in the conduction loops may generate magnetic flux. The magnetic flux passing through magnets 742 and/or the poles causes a reluctance force that attempts to push magnet 342 and the poles farther apart or pull the magnet and poles closer together, though the movement of the poles is limited to their rotational movement about spindle 744.

Figure 7B:
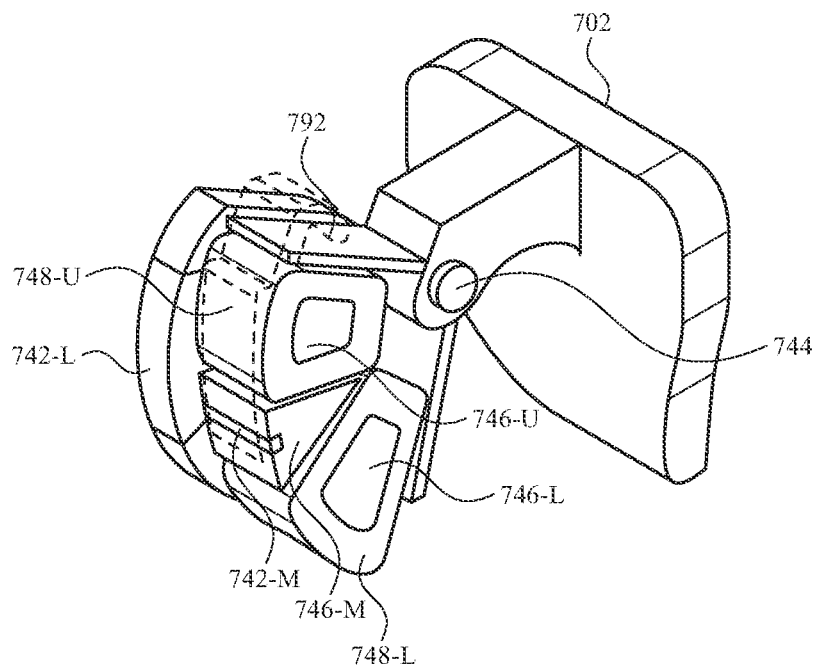
FIG. 7B illustrates a perspective view of a trigger assembly of a rotary reluctance engine similar to that of FIG. 7A but in an assembled condition according to some examples of the disclosure.

FIG. 7B illustrates a perspective view of trigger assembly 706 similar to that of FIG. 7A in an assembled condition according to some examples of the disclosure. In the example of FIG. 7B, trigger 702 is coupled to upper core/coil assembly (746-U and 748-U) and lower core/coil assembly (746-L and 748-L), and optionally to middle magnet 742-M and middle core 746-M, and all are pivotally coupled to spindle 744 such that the trigger, upper and lower core/coil assemblies, and optionally the middle magnet and middle core rotate within trigger assembly 706 when the trigger is actuated by a user. Magnet 742-L is fixed to the housing and located on the left side of the upper and lower core/coil assemblies. Magnet 742-R also fixed to the housing and is located on the right side of the upper and lower core/coil assemblies, but is not shown in FIG. 7B to simplify the drawing. Note, however, that the gap between the upper and middle segments in both magnets can be eliminated. In some examples, magnetic sensor 450 can be located along a partial perimeter of the rotational path of the upper and lower core/coil assemblies and middle magnet 742-M. Because current must be suppled to rotating upper coil 748-U and lower coil 748-L, flex circuit 792 can be connected between the fixed part of the housing and the rotating part of the reluctance engine. To accomplish this, folding flex circuit 792 can be electrically coupled between the fixed housing and the rotating upper and lower core/coil assemblies. Folding flex circuit 792 can fold and unfold to maintain electrical connections as the upper and lower core/coil assemblies are rotated as a result of trigger pressure.

It should also be noted that FIG. 7B illustrates an alternative to the optimization of the lower core/coil assembly shown in FIG. 7A. In the example of FIG. 7A, coil 748-L and core 746-L are in a more traditional radial shape with no localized radius reduction shown at 790, which results in a smaller coil volume and lower engine torque.

Figure 7C:
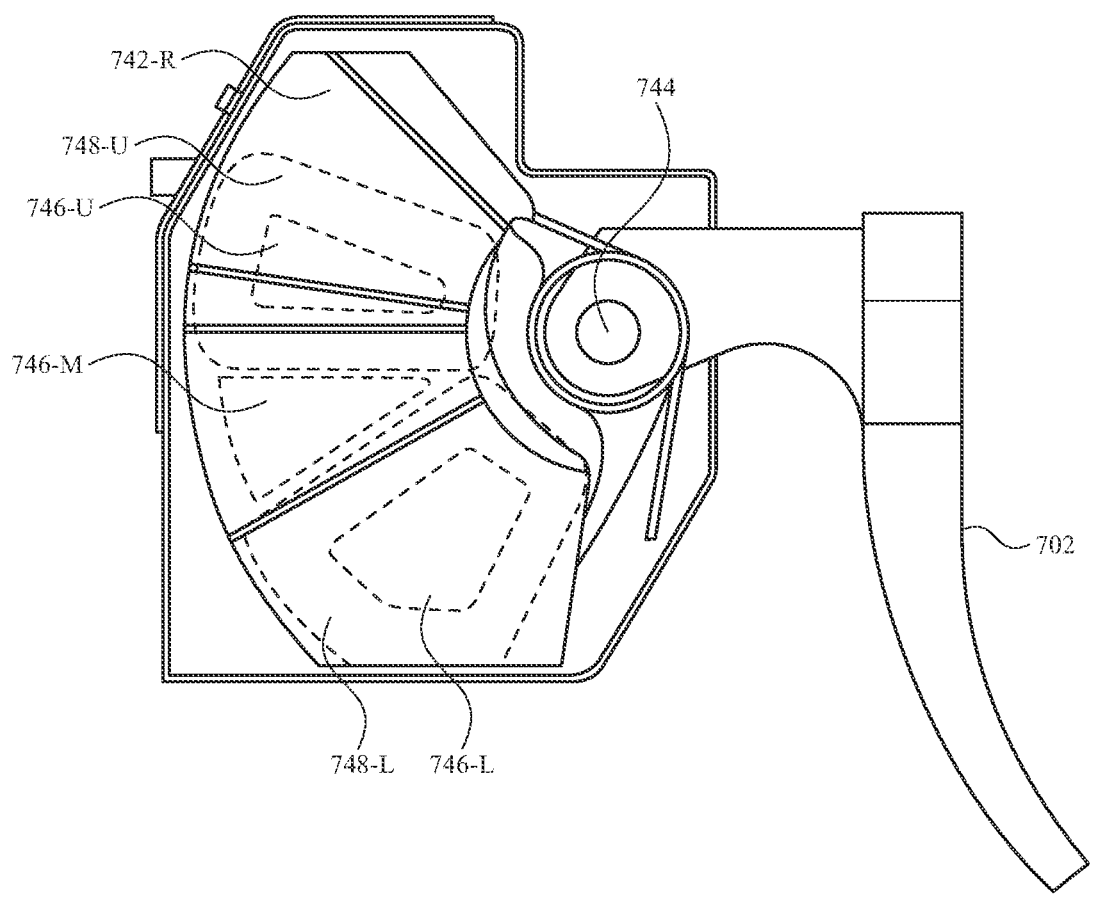
FIG. 7C illustrates a side view of the rotary reluctance engine of FIG. 7A according to some examples of the disclosure.

FIG. 7C illustrates a side view of the rotary reluctance engine of FIG. 7A according to some examples of the disclosure. In the example of FIG. 7C, right magnetic 742-R (not shown in FIG. 7B) obscures upper core/coil assembly 746-U and 748-U, lower core/coil assembly 746-L and 748-L, and middle core 746-M (indicated by dashed lines). Middle core 746-M fills up space between coils 748-U and 748-U, which can make the engine a bit stronger. Middle core 746-M can be made of high permeability ferritic material to reduce the loop reluctance (encircling the cross-section of the coil) around the neighboring coils 748-U and 748-L. When current is applied to those coils, the middle core 746-M helps to intensify the resulting magnetic flux and focuses it towards the magnet 442 to generate engine force. With three cores that can interact with magnets 742, the response can be optimized for each core individually to design the desired response. At small angular displacements, the torque can be dominated by the lower boundary of the upper segments of magnets 742 and core 746-U, with some amount of torque contributed by the boundary between the middle and lower segments in the magnets and core 746-M. With further angular displacement, the torque can be dominated by the upper boundary of the middle segment of magnets 742 and core 746-U.

FIG. 8A illustrates a symbolic representation of power consumption of the rotary reluctance engine according to some examples of the disclosure. In the example of FIG. 8A, torque represented by spring 896 is exerted directly on trigger 802 (and the user's finger), but to hold constant torque $T_{eng}(\theta)$ during period 898 the rotary reluctance engine will need to output DC power. This can be a problem when the user holds the trigger for a long period of time and that power has to be continuously supplied. In some examples, the power can be dialed down after some period of time under software control.

FIG. 8B illustrates a rotary motor for providing a constant torque on a trigger coupled to a rotary reluctance engine according to some examples of the disclosure. In the example of FIG. 8B, rather than supporting or engaging torsion spring 852 against a fixed baseline location in the trigger assembly (as shown in FIG. 3A for example), pulley 801 with spring stopper 803 rotatably coupled to spindle 844 can produce a variable rotating base for engagement with the torsion spring. Pulley 801 and stopper 803 can be actuated by rotary motor 805 and a coupling element such as transmission string 807, although in other examples the rotary motor can be coupled to the pulley via a gear in a gear box system. In the example of FIG. 8B, the rotary reluctance engine can provide the first order torque response as the trigger is angularly displaced by a user, but rotary motor 805 can also react to the user input, and over a period of time rotary motor 805 can tighten pulley 801 and stopper 803 to a new baseline such that the torsion spring tightens on the user and applies an increasing amount of torque, allowing the torque supplied by the rotary reluctance engine to reduce to zero. Rotary motor 805 can use friction to lock pulley 801 and stopper 803 in place, so that it also can reduce power to zero. If the user chooses to continuously press the trigger, then eventually the torque will be completely generated by the mechanical torsion spring and rotary motor, and there will be zero current in the rotary reluctance engine until the user chooses to release the button. At that time, the rotary reluctance engine will again react and provide torque until the slower rotary motor 805 catches up and establishes a new baseline. In essence, the rotary reluctance engine can hand off torque production to rotary motor 805, and a hybrid experience can be created with a fast but power-hungry rotary reluctance engine and a slower but statically efficient rotary motor 805. After the slower rotary motor 805 catches up, the net power in the system can go to zero, and battery life can be conserved.

FIG. 8C illustrates a symbolic representation of the hybrid power consumption of the rotary reluctance engine and rotary motor 805 according to some examples of the disclosure. In the example of FIG. 8C, torque represented by spring 896 is exerted directly on trigger 802 (and the user's finger), but unlike FIG. 8A, the baseline can be dynamically changed as indicated by arrow 809 to reduce the torque and power burden of the rotary reluctance engine. In FIG. 8C, fast transient torque $T_{eng}$ is rendered by the rotary reluctance engine, while a slow baseline torque $x_{base} \cdot k$ is provided by rotary motor 805.

FIG. 8D illustrates an alternative approach to FIG. 8B for providing a constant torque on a trigger coupled to a rotary reluctance engine according to some examples of the disclosure. In the example of FIG. 8D, a lead screw motor 811 can be used instead of a rotary motor.

The preceding examples of rotary reluctance engines primarily included one magnet and a pair of core/coil assemblies on at least one side of the magnet. In other examples, only a single core/coil assembly could be used, but the torque curve would be primarily linear and over a relatively small angular displacement range. In particular, the rendering space can be very limited at high angular displacements, and at certain angular displacements, no torque will be generated regardless of how much power is applied to the single coil. Having the additional core/coil assemblies and magnet boundaries can provide the advantage of design flexibility to expand the response curve beyond a linear response. An extra core/coil assembly can widen the rendering space at high displacements, provide extra efficiency at low displacements, and enable optimization of the design for a wider variety of response curves. Additional core/coils can be even more beneficial, subject to product space constraints.

Figure 9:
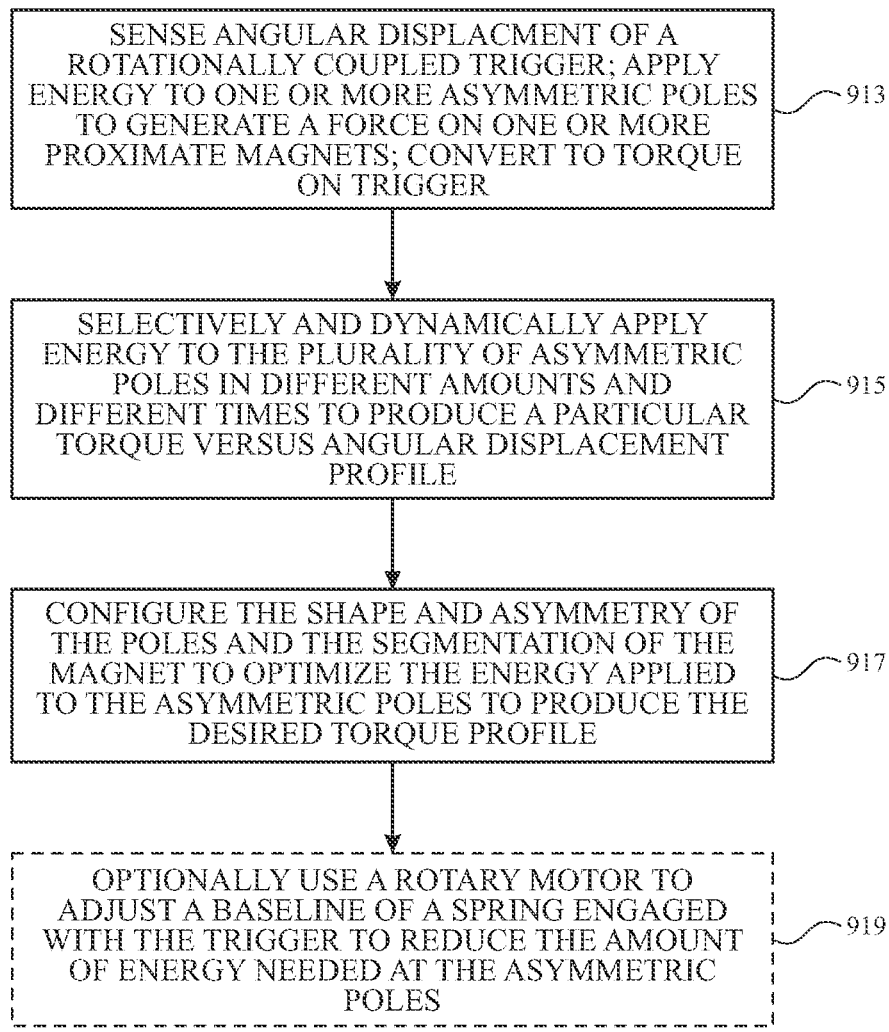
FIG. 9 illustrates a flowchart for providing torque to a trigger according to some examples of the disclosure.

FIG. 9 illustrates a flowchart for providing torque to a trigger according to some examples of the disclosure. In the example of FIG. 9, at 913 an angular displacement of a rotationally coupled trigger can be sensed, and energy can be applied to one or more asymmetric poles to generate a force on one or more proximate magnets that is converted to torque on the trigger. At 915, energy can be selectively and dynamically applied to the plurality of asymmetric poles in different amounts and at different times to produce a particular torque versus angular displacement profile. At 917, the shape and asymmetry of the plurality of asymmetric poles and the segmentation of the magnet can be configured to enable an optimization of the energy applied to the plurality of asymmetric poles to produce a desired torque profile. At 919, a rotary motor can be used to adjust a baseline of a spring engaged with the trigger to reduce the amount of energy needed at the asymmetric poles.

Therefore, according to the above, some examples of the disclosure are directed to a trigger assembly, comprising a first magnet, a plurality of asymmetric poles proximate to the first magnet, each asymmetric pole including a coil and a core configured to generate a force on the first magnet when energy is applied to the coil, and a trigger rotationally coupled for experiencing torque when the first magnet receives the force from one or more of the asymmetric poles. Additionally or alternatively to one or more of the examples disclosed above, in some examples the trigger is affixed to the magnet, and the trigger and the magnet are rotationally coupled to a spindle. Additionally or alternatively to one or more of the examples disclosed above, in some examples a first plurality of the asymmetric poles are proximate to a first side of the first magnet and affixed to a housing of the trigger assembly. Additionally or alternatively to one or more of the examples disclosed above, in some examples a second plurality of the asymmetric poles are proximate to a second side of the first magnet and affixed to the housing of the trigger assembly. Additionally or alternatively to one or more of the examples disclosed above, in some examples the plurality of asymmetric poles are proximate to a portion of an outer perimeter of the first magnet. Additionally or alternatively to one or more of the examples disclosed above, in some examples the plurality of asymmetric poles face a rotational axis of the trigger assembly. Additionally or alternatively to one or more of the examples disclosed above, in some examples the plurality of asymmetric poles are polarized radially with respect to a rotational axis of the trigger assembly. Additionally or alternatively to one or more of the examples disclosed above, in some examples the trigger assembly further comprises a magnetic sensor affixed to a housing of the trigger assembly and proximate to a portion of an outer perimeter of the first magnet, the magnetic sensor configured for detecting an angular displacement of the first magnet. Additionally or alternatively to one or more of the examples disclosed above, in some examples the trigger is affixed to the plurality of asymmetric poles, and the trigger and the plurality of asymmetric poles are rotationally coupled to a spindle. Additionally or alternatively to one or more of the examples disclosed above, in some examples the first magnet is proximate to a first side the plurality of asymmetric poles and affixed to a housing of the trigger assembly. Additionally or alternatively to one or more of the examples disclosed above, in some examples a second magnet is proximate to a second side of the plurality of asymmetric poles and affixed to the housing of the trigger assembly. Additionally or alternatively to one or more of the examples disclosed above, in some examples the trigger assembly further comprises a middle core coupled between two of the plurality of asymmetric poles. Additionally or alternatively to one or more of the examples disclosed above, in some examples the trigger assembly further comprises a middle magnet coupled between two of the plurality of asymmetric poles, and a magnetic sensor affixed to a housing of the trigger assembly and proximate to a portion of a rotational path of the middle magnet, the magnetic sensor configured for detecting an angular displacement of the middle magnet. Additionally or alternatively to one or more of the examples disclosed above, in some examples the trigger assembly further comprises a flexible printed circuit coupled between a housing of the trigger assembly and the plurality of asymmetric poles, the flexible printed circuit configured for energizing the plurality of asymmetric poles. Additionally or alternatively to one or more of the examples disclosed above, in some examples the first magnet includes a plurality of segments and one or more magnet boundaries separating adjacent segments, each pair of adjacent segments having opposite magnetic pole directions. Additionally or alternatively to one or more of the examples disclosed above, in some examples the first magnet has a truncated outer perimeter edge and an asymmetric first outer radius configured to maximize a volume of the first magnet within a housing of the trigger assembly. Additionally or alternatively to one or more of the examples disclosed above, in some examples a first asymmetric pole from the plurality of asymmetric poles includes a truncated outer perimeter edge and an asymmetric first outer radius configured to maximize a volume of the first asymmetric pole. Additionally or alternatively to one or more of the examples disclosed above, in some examples the trigger assembly further comprises a spring stopper, and a spring engaged between the spring stopper and the trigger, the spring configured for providing a spring force to the trigger. Additionally or alternatively to one or more of the examples disclosed above, in some examples the trigger assembly further comprises a pulley engaged with the spring stopper and rotatably coupled to the spindle, and a rotary motor coupled to the pulley, wherein the rotary motor is configured to rotate the pulley to vary a location of the spring stopper and enable a reduction in torque supplied by the plurality of asymmetric poles to the trigger. Additionally or alternatively to one or more of the examples disclosed above, in some examples the rotary motor is configured for rotating the pulley upon detection of a change in angular displacement of the trigger.

Some examples of the disclosure are directed to a method of providing a torque to a trigger, comprising applying energy to one or more of a plurality of asymmetric poles to generate a force on a magnet proximate to the plurality of asymmetric poles, and converting the force on the magnet to torque on a rotationally coupled trigger. Additionally or alternatively to one or more of the examples disclosed above, in some examples the method further comprises sensing an angular displacement of the rotationally coupled trigger and applying the torque to the trigger as a function of the angular displacement of the trigger. Additionally or alternatively to one or more of the examples disclosed above, in some examples the method further comprises selectively applying the energy to the plurality of asymmetric poles as a function of the angular displacement of the trigger to produce different torque versus angular displacement profiles. Additionally or alternatively to one or more of the examples disclosed above, in some examples the method further comprises selecting a shape and asymmetry of the plurality of asymmetric poles and a segmentation of the magnet to optimize the application of the energy to the one or more asymmetric poles to produce a particular torque versus angular displacement profile. Additionally or alternatively to one or more of the examples disclosed above, in some examples the method further comprises activating a rotary motor to vary a baseline of a spring engaged with the trigger and reduce the application of energy to the one or more asymmetric poles.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A trigger assembly, comprising:
   a first magnet;
   a plurality of asymmetric poles proximate to the first magnet, each asymmetric pole including a coil and a core configured to generate a force on the first magnet when energy is applied to the coil; and
   a trigger rotationally coupled for experiencing torque when the first magnet receives the force from one or more of the asymmetric poles.
2. The trigger assembly of claim 1, wherein the trigger is affixed to the first magnet, and the trigger and the first magnet are rotationally coupled to a spindle.
3. The trigger assembly of claim 2, wherein a first plurality of the asymmetric poles are proximate to a first side of the first magnet and affixed to a housing of the trigger assembly.
4. The trigger assembly of claim 3, wherein a second plurality of the asymmetric poles are proximate to a second side of the first magnet and affixed to the housing of the trigger assembly.
5. The trigger assembly of claim 2, wherein the plurality of asymmetric poles are proximate to a portion of an outer perimeter of the first magnet.
6. The trigger assembly of claim 5, wherein the plurality of asymmetric poles face a rotational axis of the trigger assembly.
7. The trigger assembly of claim 5, wherein the plurality of asymmetric poles are polarized radially with respect to a rotational axis of the trigger assembly.
8. The trigger assembly of claim 2, further comprising a magnetic sensor affixed to a housing of the trigger assembly and proximate to a portion of an outer perimeter of the first magnet, the magnetic sensor configured for detecting an angular displacement of the first magnet.
9. The trigger assembly of claim 1, wherein the trigger is affixed to the plurality of asymmetric poles, and the trigger and the plurality of asymmetric poles are rotationally coupled to a spindle.
10. The trigger assembly of claim 9, wherein the first magnet is proximate to a first side the plurality of asymmetric poles and affixed to a housing of the trigger assembly.
11. The trigger assembly of claim 10, wherein a second magnet is proximate to a second side of the plurality of asymmetric poles and affixed to the housing of the trigger assembly.
12. The trigger assembly of claim 9, further comprising a middle core coupled between two of the plurality of asymmetric poles.
13. The trigger assembly of claim 9, further comprising:
   a middle magnet coupled between two of the plurality of asymmetric poles; and
   a magnetic sensor affixed to a housing of the trigger assembly and proximate to a portion of a rotational path of the middle magnet, the magnetic sensor configured for detecting an angular displacement of the middle magnet.
14. The trigger assembly of claim 9, further comprising a flexible printed circuit coupled between a housing of the trigger assembly and the plurality of asymmetric poles, the flexible printed circuit configured for energizing the plurality of asymmetric poles.
15. The trigger assembly of claim 1, wherein the first magnet includes a plurality of segments and one or more magnet boundaries separating adjacent segments, each pair of adjacent segments having opposite magnetic pole directions.
16. The trigger assembly of claim 1, the first magnet having a truncated outer perimeter edge and an asymmetric first outer radius configured to maximize a volume of the first magnet within a housing of the trigger assembly.
17. The trigger assembly of claim 1, wherein a first asymmetric pole from the plurality of asymmetric poles includes a truncated outer perimeter edge and an asymmetric first outer radius configured to maximize a volume of the first asymmetric pole.

18. The trigger assembly of claim 1, further comprising:
a spring stopper; and
a spring engaged between the spring stopper and the trigger, the spring configured for providing a spring force to the trigger.

19. The trigger assembly of claim 18, further comprising:
a pulley engaged with the spring stopper and rotatably coupled to a spindle; and
a rotary motor coupled to the pulley;
wherein the rotary motor is configured to rotate the pulley to vary a location of the spring stopper and enable a reduction in torque supplied by the plurality of asymmetric poles to the trigger.

20. The trigger assembly of claim 19, wherein the rotary motor is configured for rotating the pulley upon detection of a change in angular displacement of the trigger.

21. A method of providing a torque to a trigger, comprising:
applying energy to one or more of a plurality of asymmetric poles to generate a force on a magnet proximate to the plurality of asymmetric poles; and
converting the force on the magnet to torque on a rotationally coupled trigger.

22. The method of claim 21, further comprising sensing an angular displacement of the rotationally coupled trigger and applying the torque to the trigger as a function of the angular displacement of the trigger.

23. The method of claim 22, further comprising:
selectively applying the energy to the plurality of asymmetric poles as a function of the angular displacement of the trigger to produce different torque versus angular displacement profiles.

24. The method of claim 22, further comprising:
selecting a shape and asymmetry of the plurality of asymmetric poles and a segmentation of the magnet to optimize the applying of the energy to the one or more asymmetric poles to produce a particular torque versus angular displacement profile.

25. The method of claim 21, further comprising:
activating a rotary motor to vary a baseline of a spring engaged with the trigger and reduce the applying of the energy to the one or more asymmetric poles.

* * * * *